United States Patent [19]
Sands et al.

[11] Patent Number: 5,034,290
[45] Date of Patent: Jul. 23, 1991

[54] BATTERIES

[75] Inventors: Gilbert Sands; John Molyneux; Peter J. Bindin, all of Cheshire; Walter A. Dawson, Chester, all of United Kingdom

[73] Assignee: Chloride Silent Power Limited, Runcorne, England

[21] Appl. No.: 319,238

[22] PCT Filed: Jun. 24, 1988

[86] PCT No.: PCT/GB88/00500

§ 371 Date: Feb. 28, 1989

§ 102(e) Date: Feb. 28, 1989

[87] PCT Pub. No.: WO89/00344

PCT Pub. Date: Jan. 12, 1989

[30] Foreign Application Priority Data

Jul. 3, 1987 [GB] United Kingdom ............... 87 15708

[51] Int. Cl.⁵ ...................... H01M 2/14; H01M 2/22
[52] U.S. Cl. .................... 429/120; 429/130; 429/153; 429/159; 429/160; 429/247
[58] Field of Search ................ 429/152–154, 429/157–160, 247, 120, 129, 130

[56] References Cited

U.S. PATENT DOCUMENTS

| | | | |
|---|---|---|---|
| 2,185,829 | 1/1940 | Burgess | 429/159 |
| 3,992,225 | 11/1976 | Sykes | 429/1 |
| 4,091,186 | 5/1978 | Ott et al. | 429/157 |
| 4,478,277 | 10/1984 | Friedman et al. | 165/185 |

FOREIGN PATENT DOCUMENTS

| | | |
|---|---|---|
| 109543 | 5/1984 | European Pat. Off. . |
| 237828 | 9/1987 | European Pat. Off. . |
| 2451332 | 5/1975 | Fed. Rep. of Germany . |
| 2819026 | 11/1979 | Fed. Rep. of Germany . |
| 2197241 | 3/1974 | France . |
| 2303034 | 10/1976 | France . |
| 2305865 | 10/1976 | France . |
| 93158 | 2/1922 | Switzerland . |
| 2153136 | 8/1985 | United Kingdom . |

OTHER PUBLICATIONS

Abstract of U.S. Pat. No. 1215004, 2/1917 (Decker), class 204/52.
Abstract of Japanese 61-110974, 5/1986 (Kagawa).
Abstract of Japanese 61-110973, 5/1986 (Kagawa).

*Primary Examiner*—Stephen J. Kalafut
*Attorney, Agent, or Firm*—Finnegan, Henderson, Farabow, Garrett & Dunner

[57] ABSTRACT

Various constructions of battery are disclosed, each comprising one or more arrays of single cells or series arrangements of cells, arranged between bus plates and separated by separator members and spacers.

33 Claims, 7 Drawing Sheets

BATTERIES

This invention relates to batteries, and in particular to composite batteries comprising a plurality of interconnected cells.

Many forms of battery are known, from a single cell, to arrangements comprising a plurality of interconnected cells as necessary to give a required energy storage capacity.

Batteries can also be divided into two main types; primary batteries which have a relatively short life and which are discarded when exhausted, such batteries often being a single cell and used for torches, radios and toys; and secondary batteries which are rechargable when exhausted and thus have a relatively long life, such batteries being used for starting automobiles, powering fork lift trucks and electric vehicles, and providing standby power for buildings and telephone exchange equipment.

Both primary and secondary batteries of dry alkaline type are known, as are secondary batteries of lead acid type.

Recently secondary batteries of sodium sulphur type have become known, such batteries having the advantages of light weight, high storage capacity and relatively quick recharging time. Further, such batteries use sodium and sulphur both of which are cheap and abundant materials.

Unlike conventional lead acid batteries in which a liquid electrolyte—dilute sulphuric acid separates two solid electrodes, in a sodium sulphur battery a solid electrolyte—beta alumina separates two liquid electrodes, namely liquid sulphur and sodium electrodes.

Figure 1:
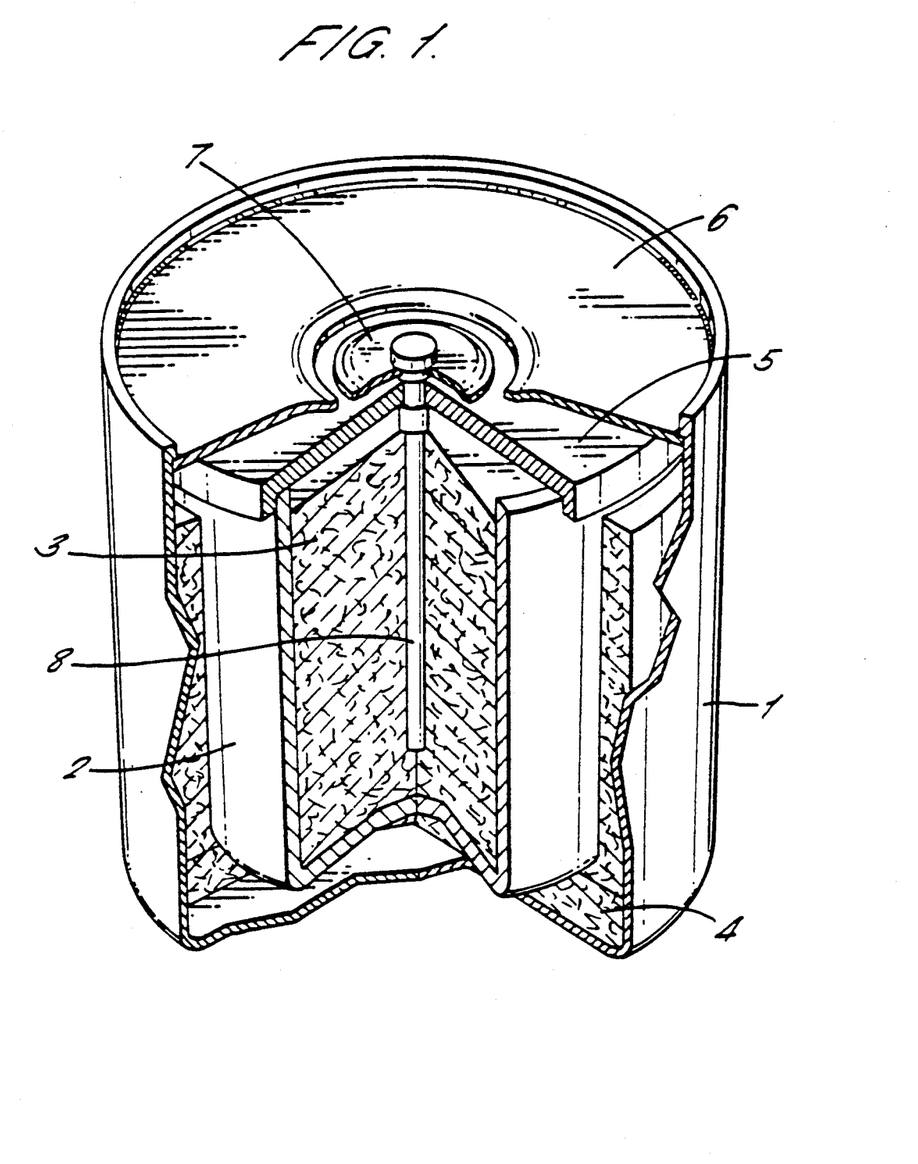
FIG. 1 is a perspective view of a sodium-sulphur cell with part broken away.

Such a sodium sulphur cell is shown in FIG. 1 of the drawings, which is a perspective view of the cell with part broken away.

As shown the cell comprises a pressed steel case 1 in the form of a right circular cylinder containing a solid electrolyte cup 2 of beta alumina, the cup 2 containing a sodium electrode 3, while a space between the case 1 and the cup 2 contains a sulphur electrode 4. For use, the cell is maintained at a temperature of about 350° C. such that the sodium and sulphur electrodes 3 and 4 are in liquid form.

The open end of the cup 2 is closed by an insulating disc 5 of alpha alumina, while the case 1 is closed by an annular steel disc 6.

The case 1 serves as a terminal for the sulphur electrode 4, while the sodium electrode 3 contains an elongate metal current collector 8 which extends axially of the case 1 out through the disc 5 where it is connected to a center terminal disc 7 mounted on the disc 5, the necessary connections being made by welding.

The atomic structure of beta alumina is such that it acts as a selective ion filter. When the cell is discharging sodium ions pass from the sodium electrode 3 through the electrolyte 2 to react with the sulphur electrode 4 to form sodium sulphide. The chemical energy of this reaction is converted directly to electrical energy.

When the cell is charged, sodium and sulphur are regenerated from the sodium sulphide, the input electrical energy being converted into chemical energy.

To provide a battery capable of powering a vehicle it may be necessary for about 3000 cells as described above to be assembled together in arrays of series-connected arrangements of cells, the arrangements in each array being connected in parallel, and the arrays of arrangements being connected in series.

According to one aspect, this invention provides a battery comprising a plurality of cells or series arrangements of cells arranged between a pair of electrically conductive bus plates each serving to interconnect corresponding terminals of the cells or series arrangements therebetween, each terminal of each cell, or the end terminal of each series arrangement, being connected to the adjacent bus plate by means of a conductive metal strip welded to the terminal and having free ends passing through a hole in the bus plate and welded to the side of the bus plate remote from the terminal.

According to another aspect, this invention provides a battery comprising a plurality of parallel cells or parallel series arrangements of cells, including electrically insulating separators between adjacent cells or series arrangements, the separators being in the form of metal sheets covered with an electrically insulating coating.

According to yet another aspect, this invention provides a battery comprising a plurality of parallel cells or parallel series arrangements of cells, including electrically insulating separators between adjacent cells or series arrangements, each separator comprising an elongate member formed with peripherally spaced concave surfaces which engage respective cells or cells in respective series arrangements.

According to a further aspect, this invention provides a battery comprising one or more arrays of cells or series arrangements of cells, arranged between a pair of bus plates, including a heat sink in thermal connection with one of the bus plates of the or each array with an interposed electrically insulating layer interposed between the heat sink and the bus plate or plates.

According to a still further aspect, this invention provides a battery enclosed in a thermally insulating housing which helps to maintain the battery at a required temperature, in which terminals of the battery are connected to leads which extend out of the housing, the length of each lead within the housing wall being greater than the thickness of that housing wall.

Various batteries according to this invention reference to the drawings, in which.

Figure 2:
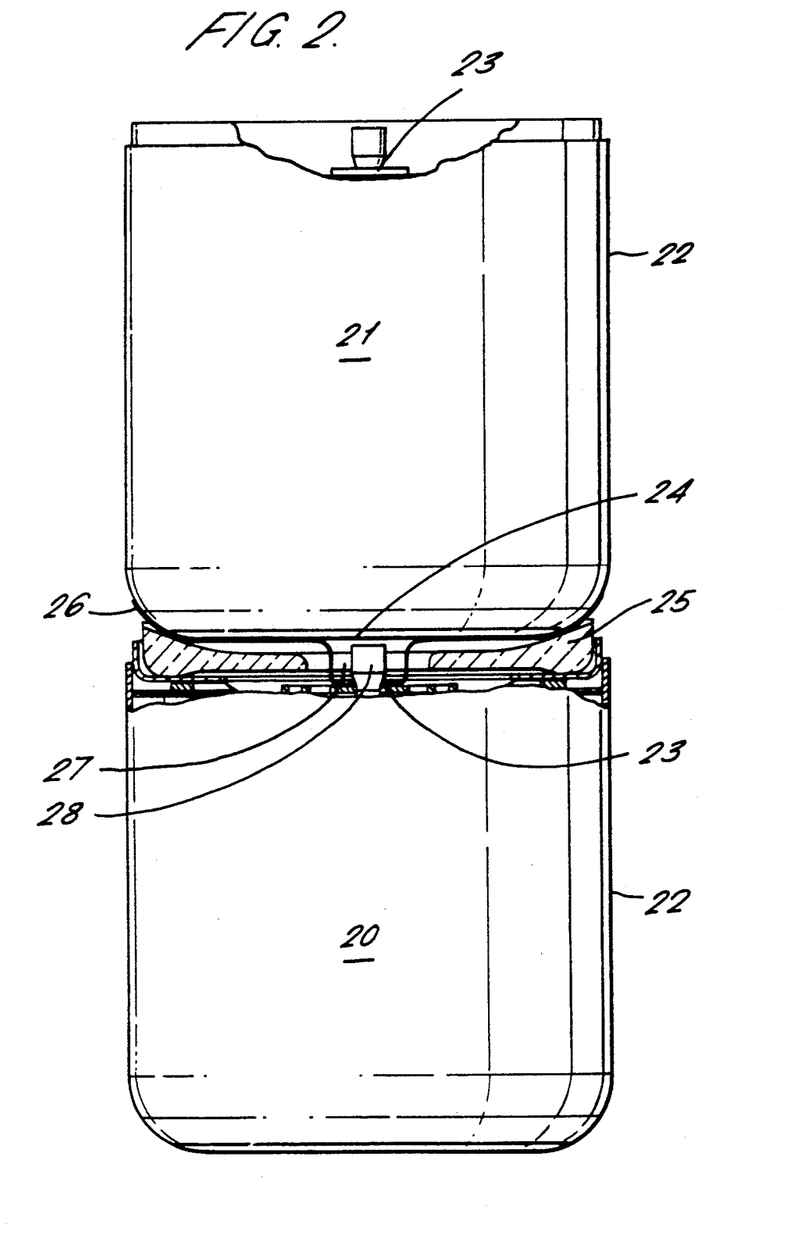
FIG. 2 illustrates the series connection of two cells as shown in FIG. 1.

FIG. 2 of the drawings is a side view, partly in section, of a two-cell battery comprising a pair of cells separated by an interposed spacer member, a terminal of one cell being connected to a terminal of the other cell by a conductive member secured to the terminals of the two cells and extending through an aperture in the spacer member.

With cells as described above with reference to FIG. 1, the conductive member can be welded to the center terminal disc of the one cell and to the case of the other cell, thereby to connect the cells together in series.

The spacer member can be of any suitable insulating material, such as a ceramic or porcelain material, and can either be preformed, for example in the shape of an annulus, or otherwise formed in situ, for example by injection of a cement material between the cells.

The spacer member serves to prevent contact between the cases of the two cells while permitting the necessary connection between the center terminal of one cell and the case of the other.

More specifically the battery of FIG. 2 comprises two cells 20, 21, each having a cylindrical case 22 constituting one terminal and a center terminal disc 23 at one end of the case 22 constituting the other terminal. The cells 20, 21 are arranged end-to-end with the center terminal disc 3 of the lower (as shown) cell 20 adjacent the bottom surface 24 of the other upper (as shown) cell 1, with an annular spacer member 25 of insulating ceramic or porcelain material interposed between them. The spacer member 25 serves to prevent contact between the cases 22 of the two cells 20, 21. A strip 26 of conductive metal extends across the bottom surface 24 of the upper cell 21 and is welded thereto at the free ends of the strip 26. At its center the strip is formed, to extend downwardly through the aperture 27 in the spacer member 25 to engage over the current collector 28 of the lower cell 20 and be welded to the center terminal disc 23 of the lower cell 20. The strip 26 thus provides the necessary connection between the center terminal disc 23 of the lower cell 20 and the case 22 of the upper cell 21, while the spacer member 25 prevents direct contact between the cases 22 of the two cells 20, 21.

Clearly larger batteries can be provided by arranging the required number of cells in end-to-end arrangement with an annular spacer member interposed between each pair of adjacent cells and with adjacent cells connected by a welded strip conductor as described.

To achieve a battery having the required storage capacity and voltage, it may be necessary to connect a plurality of cells or series arrangements of cells, for example as described with reference to FIG. 1 or FIG. 2, in parallel, that is with ends of the cells or series arrangements connected together, and such a battery will now be described with reference to FIG. 3 of the drawings which is a sectional side elevational view of part of the battery.

The battery comprise a plurality of series arrangements of cells arranged between a pair of electrically conductive bus plates each serving to interconnect corresponding terminals of the series arrangements therebetween.

The end terminal of each series arrangement is connected to the adjacent bus plate by means of conductive metal strip welded to the terminal and having free ends passing through a hole in the bus plate and welded to the side of the bus plate remote from the terminal.

One bus plate (the lower one in the drawing) serves to interconnect the cases of the cells at one end of the arrangements. If equalization of voltage is required, then other corresponding cells in the series arrangements can be interconnected by means of electrically conductive members arranged between their cases, the battery thus comprising a plurality of series arrangements of parallel connected cells.

Figure 3:
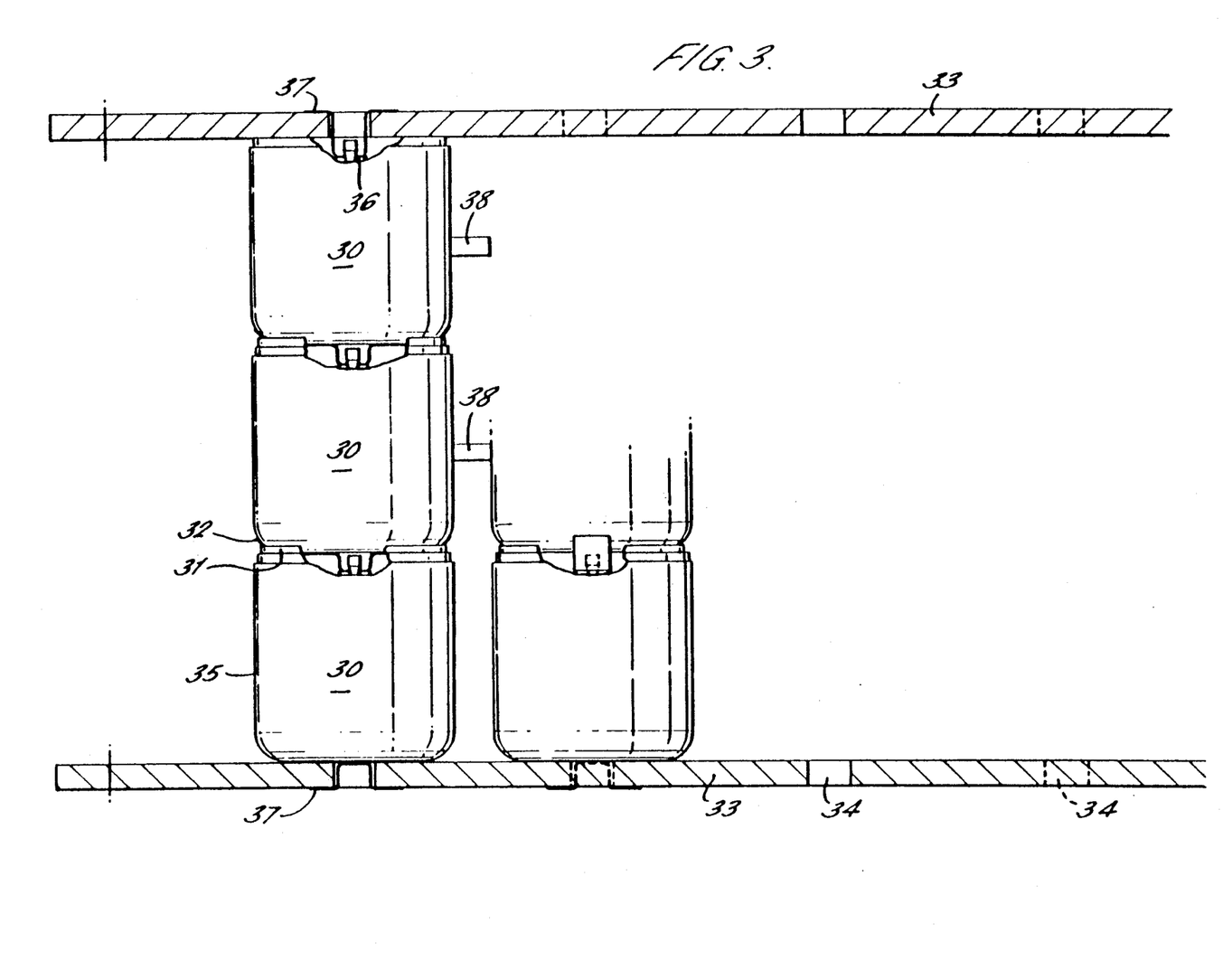
FIG. 3 illustrates a battery comprising a plurality of series arrangements of cells arranged between a pair of bus plates.

More specifically, as shown in FIG. 3 a plurality of series arrangements each of three cells 30, as described above with reference to FIGS. 1 and 2, with adjacent cells in each arrangement separated by spacer members 31 and connected by conductive metal strips 32, are arranged in parallel between a pair of mild steel bus plates 33.

Each bus plate 33 is formed with a matrix of holes 34 aligned with the central axes of the series arrangements of cells 30, and the case 35 of the lower (as shown) cell 30 in each arrangement, and the center terminal disc 36 of the upper (as shown) cell 30 in each arrangement, is electrically connected to the adjacent bus plate 33 by means of a conductive metal strip 37 welded at its center to the case 35 or terminal disc 36, and having its free ends passing through the aligned hole 34 and welded to the side of the bus plate 33 remote from the cells 30.

Thus, the cells 30 are connected in series within each series arrangement while the series arrangements are connected in parallel by the bus plates 33. As shown, the cases 35 of corresponding cells 30 in the series arrangements are interconnected by electrically conductive members 38 arranged between them whereby equalization of voltage is achieved at each cell level in the battery.

As a modification of the battery described above with reference to FIG. 3, the lower cell 30 in each series arrangement can be connected to the adjacent bus plate 33 by a conductive metal strip 37 having its free ends welded to the case 35 of the cell 30 with an initial central loop portion extending through the aligned hole 34 in the bus plate 33. The loop portion is then cut to provide two free end portions which are then folded back over the surface of the bus plate 33 remote from the cells 30, and welded thereto.

Batteries as described above have the advantage of low resistance in the connections between adjacent cells and between the series arrangements of cells.

With a battery as shown in FIG. 3, the pair of bus plates can be clamped together by means of a plurality of tie rods, for example one adjacent each corner of the battery, each tie rod either having a head at one end and a screw thread at the other, or screw threads at both ends. The ends of the tie rods can be located in pockets formed in the bus plates in any convenient manner in order to maintain a flush arrangement, nuts being applied to the threads on the rods and tightened to clamp the bus plates together. An insulating washer of, for example, ceramic material, is provided at least one end of each tie rod in order to prevent the tie rod providing a short circuit between the bus plates.

Figures 4, 5:
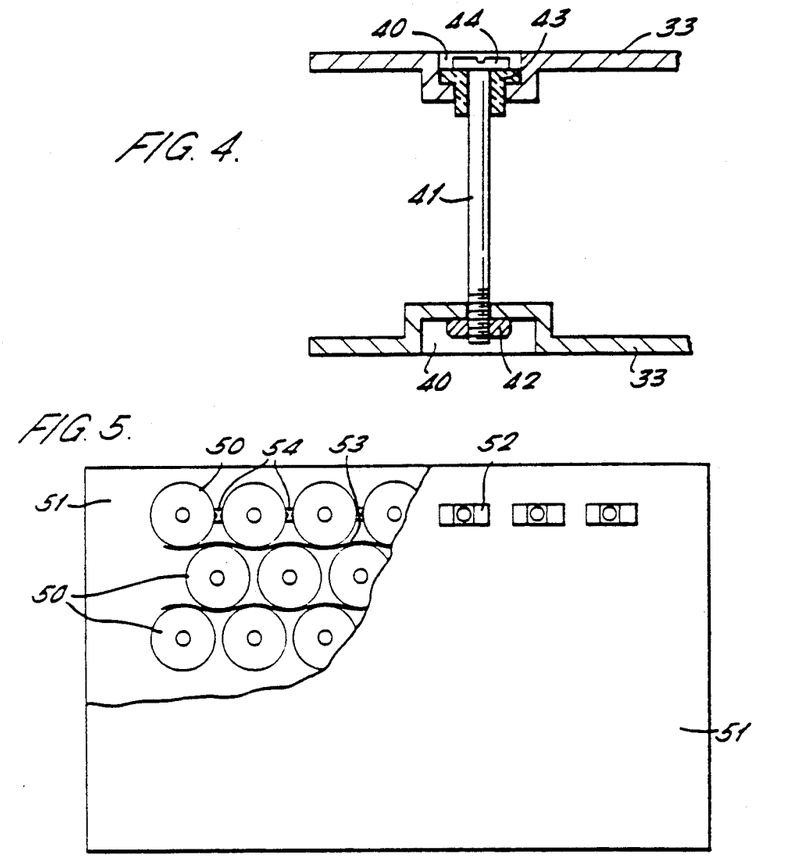
FIG. 4 illustrates a method of securing the bus plates of the arrangement of FIG. 3 together.
FIG. 5 is a plan view of a battery having separators between adjacent cells.

Such an arrangement is shown in FIG. 4 of the drawings, which shows bus plates 33 each formed with a pocket 40. A tie rod 41 extends between the pockets 40. The pocket 40 in the lower plate 33 receives a nut 42 engaged on a thread on the tie rod 41, while the pocket in the upper plate 33 receives a ceramic insulating washer 43 which is engaged by a head 44 on the rod 41. By tightening the nut 42 the plates 33 can be clamped together about the series arrangements of cells therebetween.

With a battery as described above comprising a plurality or series arrangements or cells clamped between a pair of bus plates, it must be ensured that the cases of cells in adjacent series arrangements do not touch and thus produce unwanted short-circuit paths. Further, it is preferable for the series arrangements to be as close as possible to each other in order to keep the battery as small as possible.

Thus, a battery comprising a plurality of cells clamped between a pair of bus plates preferably includes electrically insulating separators between adjacent cells.

Preferably the separators extend the full distance between the bus plates.

The cells can be in series arrangements as described above, in which case the separators preferably each extend the length of the series arrangements between the bus plates.

The separators can be in the form of corrugated sheets each having a plurality of corrugations shaped to engage about part of the periphery of a plurality of cells or series arrangements of cells, respectively, thereby to maintain adjacent cells or series arrangements in the required spaced array.

The separators can be made of aluminium sheets of say 1.6 mm thickness, covered with an electrically insulating coating of, for example, flame sprayed ceramic material, alumina, chromium carbide, or magnesia. The sheets can otherwise be anodized or coated with a heat resistant vitreous enamel.

The separators not only serve to insulate adjacent cells from one another while also serving to locate the cells in the complete cell array, but also serve to conduct heat within the array of cells and between the bus plates to maintain a substantially uniform temperature throughout the battery.

FIG. 5 of the drawings in a plan view of a battery including separators as described above, the upper bus plate of the battery being partly broken away.

As shown, a plurality of series arrangements of cells 50 are arranged between two bus plates 51, with the end cells 50 in each arrangement being electrically connected to the adjacent bus plate 51 by metal strips 52, as shown in FIG. 3. The cell arrangements are arranged in mutually staggered rows with corrugated insulating separators 53 arranged between the rows, the separators 53 serving to electrically insulate the cells in adjacent rows from each other while maintaining the cells 50 in their positions in the complete array. If necessary or desirable adjacent cells 50 in the rows defined by the separators 53 can be separated by electrically insulating chock members 54 which can either extend the full height of the series arrangements of cells or be individual to pairs of adjacent cells 50.

Figure 6:
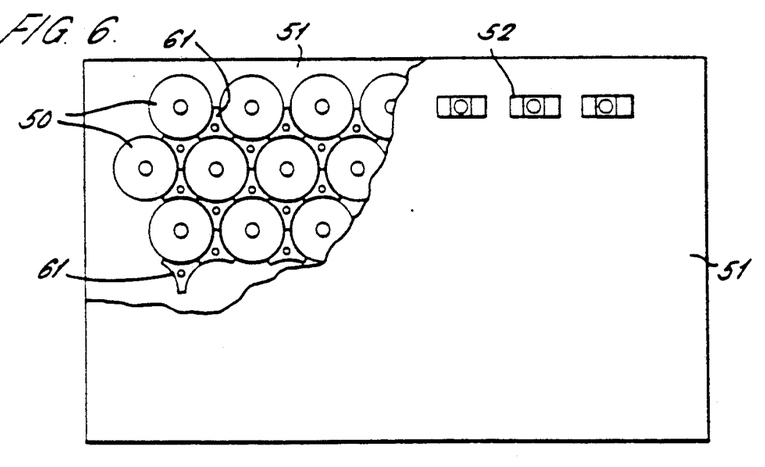
FIG. 6 is a plan view of a battery similar to that of FIG. 5 but with a different form of separator.
Figure 7:
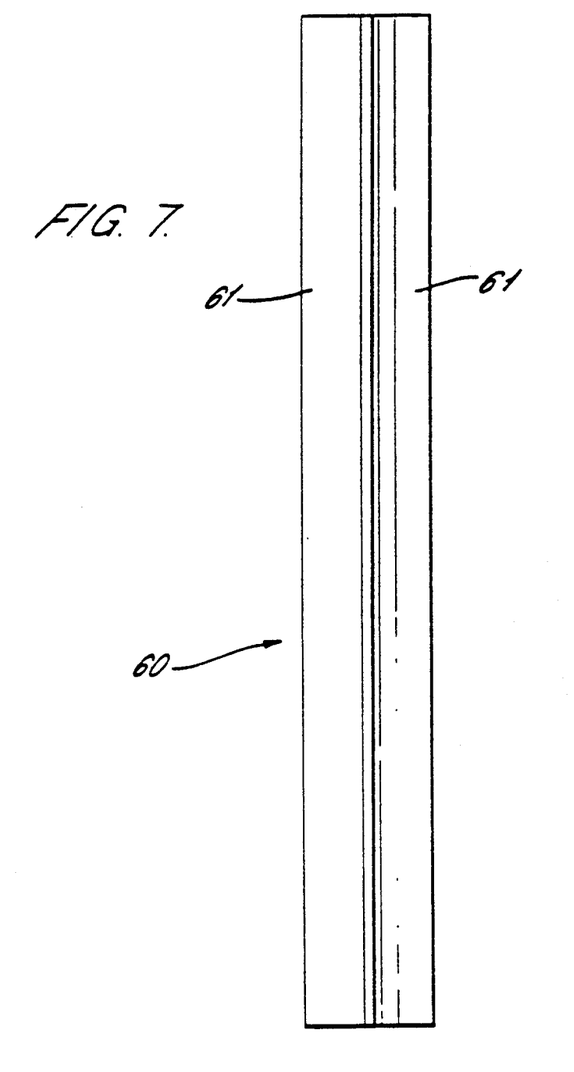
FIG. 7 is a side view of a separator of the battery of FIG. 6.
Figure 8:
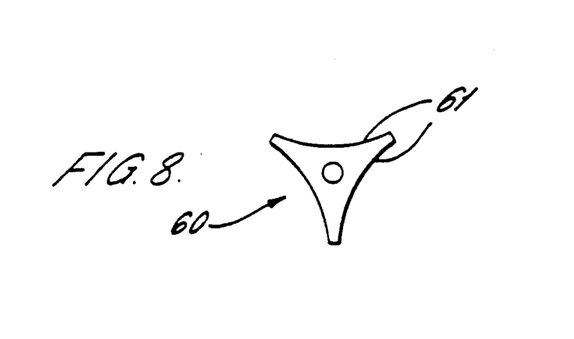
FIG. 8 is an end view of the separator of FIG. 7.

FIG. 6 of the drawings shows a battery including a different form of separator, each comprising an elongate member extending between the bus plates 51 and formed with three peripherally spaced concave surfaces 61 which engage respective cells 50 or the cells in respect series arrangements. FIGS. 7 and 8 of the drawings are a side elevation view and an end view, respectively, of such a separator 60.

Such separators can be made of porcelain material such as cordierite, for example by extrusion, and can be of any length, the appropriate number being used as required.

Although in the battery shown in FIG. 6 all the space between the cells 50 is filed with spacer members 61, it will be appreciated that alternate rows of spacer members 61 can be omitted to leave air spaces, the remaining spacer members 61 being sufficient to locate the cells 50 as necessary.

Further, as shown, the spacer members can each have a longitudinally extending hole therethrough for the passage of a cooling fluid through the battery.

A complete battery can be constituted by one or more arrays of cells or series arrangements of cells, arranged between a pair of bus plates, as described above.

Such a battery can include a heat sink in thermal connection with one of the bus plates of the or each array with an interposed electrically insulating layer interposed between the heat sink and the bus plate or plates, heat from the array or arrays being conducted to the heat sink for dissipation as necessary.

The heat sink can be of aluminium with the insulating layer being in the form of a suitable coating thereon The heat sink can be formed of two layers of aluminium with an electrical heating element sandwiched between them, the heating element serving for at least initial heating of the battery from cold. Otherwise the heating element can be located in a slot in a one piece heat sink.

The heat sink can otherwise be constructed from a relatively thin aluminium sheet carrying a foil of pyrolitic graphite Such a foil has a very anisotropic heat conductivity, being high in the plane of the foil and low transverse to the plane of the foil The aluminium sheet would be formed with a plurality of studs which are received in respective holes in the foil thereby to transmit heat between the sheet and foil With such a heat sink the heat from the battery would be conducted to the edges of the heat sink for dissipation. As a modification of such a heat sink the pyrolitic graphite foil can be cut into strips and reassembled to give a layer with high conductivity through the thickness of the heat sink and in only one direction in the plane of the heat sink whereby heat to be dissipated is conducted to one edge only of the heat sink for dissipation.

Figure 9:
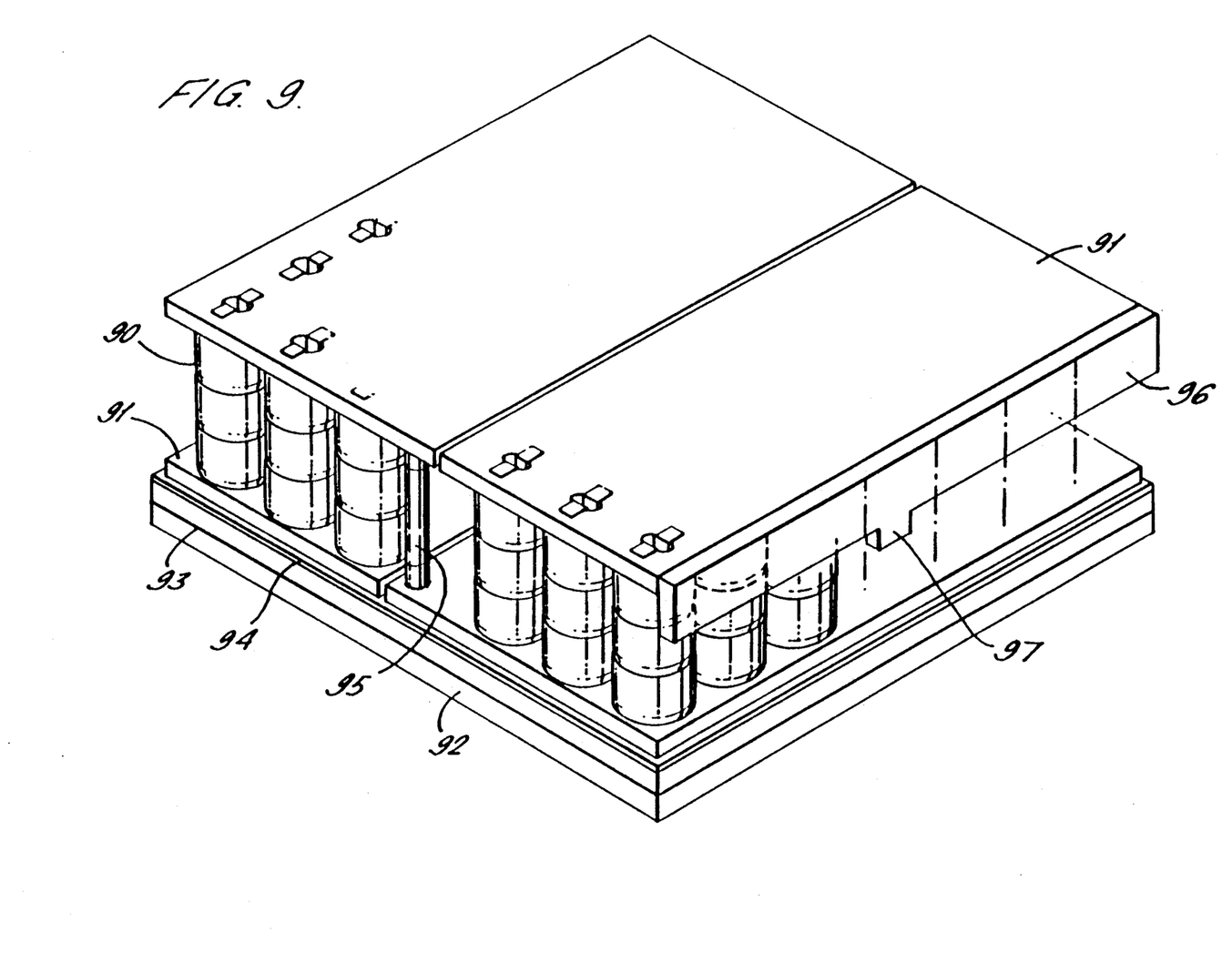
FIG. 9 is a perspective view of a battery comprising two arrays of series arrangements of cells.

FIG. 9 of the drawings above shows a complete battery comprising two arrays of series arrangements of cells 90 arranged between respective pairs of bus plates 91 as described above, with the lower bus plates 91 of the arrays resting on a common aluminium heat sink 92 having an electrical heating element 93 sandwiched therein, there being an electrical insulating layer 94 between the bus plates 91 and the heat sink 92.

As shown in FIG. 9, the upper bus plate 91 of one array of cells is connected to the lower bus plate 91 of the other array of cells, thereby to connect the two arrays in series, by means of a number (only one shown) of rods 95. The rods 95 can be of aluminium but with stainless steel end portions. Thus, the end portions of the rods 95 can be readily welded to the mild steel bus plates, welded interconnections being desirable in order to keep the internal resistance of the battery as low as possible. The stainless steel end portions can readily be friction welded to the aluminium rods, whereas aluminium can not be welded to mild steel.

Otherwise a single plate can be bent to serve as the upper bus plate of one array and the lower bus plate of the adjacent array, the intermediate portion of the plate extending between the arrays and in effect replacing the rods 95. Further, if an array can be used upside down in relation to an adjacent array, a single "double size" bus plate can be used to span the two arrays.

The current distribution in a bus plate 91 can be improved by providing an edge plate 96 along one edge of the bus plate 91, for example by welding a strip of aluminium to the bus plate 91 as shown in FIG. 9. Such an edge plate can be provided with one or more tab portions 97 for establishing electrical connections thereto.

If required the heat sink 92 can be used as one terminal of the complete battery by being connected to the lower bus plate 91 of one of the arrays.

Although the battery shown in FIG. 9 consists of only two cell arrays, it will be appreciated that any required number of arrays can be similarly connected to give a complete battery having the required parameters.

For use, batteries as described above are generally enclosed in a thermally insulating housing which helps to maintain the battery at the required temperature. Such a housing can be constructed from two spaced layers of steel, with the space between the layers evacuated to give good thermal insulation properties. One end of such a housing can initially be left open for insertion of the battery, and can then be closed, for example by a wall of insulating material or by a wall constructed similarly to the remainder of the housing, but having a portion or portions formed of electrically insulating material for passage therethrough of leads for establishing connections to the terminals of the battery.

Batteries as under consideration are capable of giving high power output, and thus the leads connected thereto must be of substantial diameter, say 6 mm. Such leads can be connected to the terminals of the battery and led out of the housing through the insulating wall or the insulating material in the finally applied wall.

A difficulty which arises with such provision of leads is that due to the necessary size, that is cross-section, of the leads for them to serve their electrical-function, they also provide a good path for heat to be conducted out of the battery, and steps should be taken to minimize this heat loss.

Figure 10:
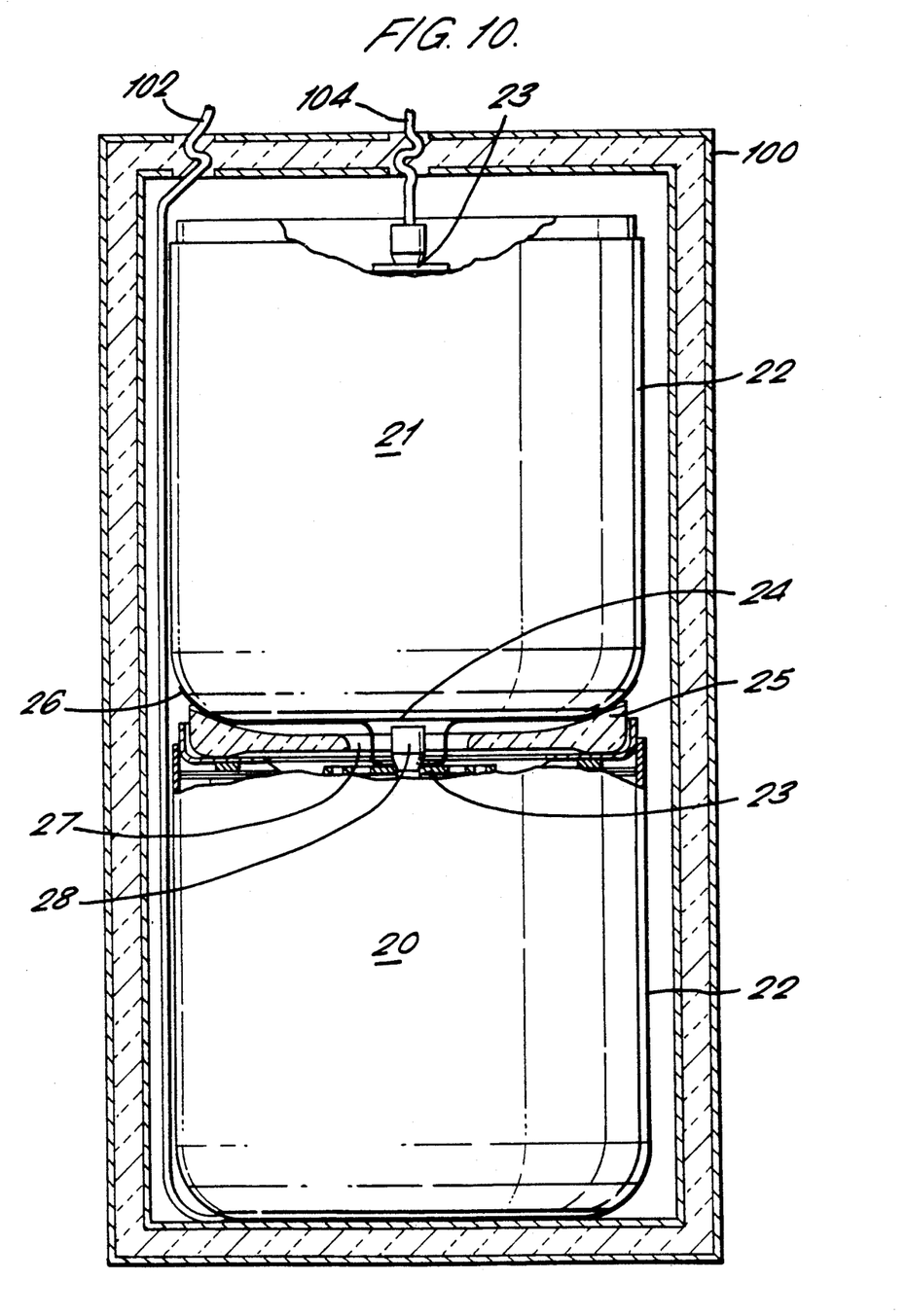
FIG. 10 illustrates a battery within a housing wall wherein the length of each lead within the housing wall is greater than the thickness of the housing wall.

Thus, as shown schematically in FIG. 10, in such a battery assembly comprising a battery contained in a thermally insulating housing 100, with terminals of the battery being connected to leads 102, 104 which extend out of the housing 100, the length of each lead within the housing wall is preferably greater than the thickness of that housing wall.

Such an arrangement enables leads of sufficient power handling capability to be used while restricting heat loss from the battery along the leads to a minimum.

The greater the length of lead used the greater the electrical resistance, and thus care must be taken to ensure that the length used does not result in creation of a hot spot in the lead.

As an example, with a lead diameter of 6 mm, a length of lead of 120 mm in a housing wall thickness of 50 mm has been found to be acceptable.

The temperature across the wall of the housing of a battery assembly as discussed above changes gradually, and thus the leads should extend gradually through the wall thickness. This can be achieved by winding the portion of each lead in the wall into a helical path which progresses gradually across the wall thickness.

Otherwise the lead can follow a zig-zag path or any planar path of suitable length. The dimensions of the lead can vary along the path in order to give the lead the required thermal conductivity at all positions along the path.

Although the batteries specifically described above comprise sodium sulphur cells it will be appreciated that batteries as described can otherwise incorporate cells of a different type.

We claim:

1. A battery comprising a plurality of cells or series arrangements of cells arranged between a pair of electrically conductive bus plates each serving to interconnect corresponding terminals of the cells or series arrangements therebetween, each terminal of each cell, or the end terminal of each series arrangement, being connected to the adjacent bus plate by means of a conductive metal strip welded to the terminal and having free ends passing through a hole in the bus plate and welded to the side of the bus plate remote from the terminal.

2. A battery as claimed in claim 1, comprising series arrangements of cells in which corresponding cells in the series arrangements are interconnected by means of electrically conductive members arranged between their cases whereby the battery comprises a plurality of series arrangements of parallel connected cells.

3. A battery as claimed in claim 1 or claim 2, in which the bus plates are clamped together by means of a plurality of tie rods.

4. A battery as claimed in claim 3, in which the ends of the tie rods are located in pockets formed in the bus plates in order to maintain a flush arrangement, an insulating washer being provided at least one end of each tie rod in order to prevent the tie rod providing a short circuit between the bus plates.

5. A battery as claimed in claim 1, including electrically insulating separators between adjacent cells.

6. A battery as claimed in claim 5, in which the separators extend the full distance between the bus plates.

7. A battery as claimed in claim 5, in which the cells are in series arrangements, the separators each extending the length of the series arrangements between the bus plates.

8. A battery as claimed in any one of claims 5 to 7, in which the bus plates are clamped together by means of a plurality of tie rods.

9. A battery as claimed in any preceding claim consisting of a plurality of series arrangements of cells, in which adjacent cells in each series arrangement are separated by an interposed spacer member, a terminal of one cell being connected to a terminal of the adjacent cell by a conductive member secured to the terminals of the two cells and extending through an aperture in the spacer member.

10. A battery as claimed in claim 9, in which the conductive member is welded to a center terminal disc of the one cell and to a case of the adjacent cell, thereby to connect the cells together in series.

11. A battery as claimed in claim 9 or claim 10, in which the spacer member is of a ceramic or porcelain material.

12. A battery as claimed in claims 9 or 10, in which the spacer member has been formed in situ by injection of material between the cells.

13. A battery according to claim 5 comprising a plurality of parallel cells or parallel series arrangements of cells, including electrically insulating separators between adjacent cells or series arrangements, each separator comprising an elongate member formed with peripherally spaced concave surfaces which engage respective cells or cells in respective series arrangements.

14. A battery comprising a plurality of parallel cells or parallel series arrangements of cells, including electrically insulating separators between adjacent cells or series arrangements, the separators being in the form of corrugated metal sheets covered with an electrically insulating coating, each corrugated metal sheet having a plurality of corrugations shaped to engage about part of the periphery of a plurality of cells or series arrangements of cells, thereby to maintain adjacent cells or series arrangements in the required space array.

15. A battery as claimed in claim 14, in which the separators are made of anodized aluminium sheets.

16. A battery as claimed in claim 14, in which the separators are made of metal sheets which are coated with a heat resistant vitreous enamel.

17. A battery comprising one or more arrays of cells or series arrangements of cells, arranged between a pair of bus plates, including a heat sink in thermal connection with one of the bus plates of the or each array with an interposed electrically insulating layer interposed between the heat sink and the bus plate or plates.

18. A battery as claimed in claim 17, in which the heat sink is of aluminium with the insulating layer being in the form of a suitable coating thereon.

19. A battery as claimed in claim 17, in which the heat sink is formed of two layers of aluminium, the battery further including an electrical heating element sandwiched between said two layers of aluminium.

20. A battery as claimed in claim 17, wherein the heat sink includes a slot, the battery further including a heating element located in said slot in the heat sink.

21. A battery as claimed in claim 17, in which the heat sink is constructed from a relatively thin aluminium sheet carrying a foil of pyrolitic graphite.

22. A battery as claimed in claim 21, in which the aluminium sheet is formed with a plurality of studs which are received in respective holes in the foil thereby to transmit heat between the sheet and foil.

23. A battery as claimed in claim 21, in which the pyrolitic graphite foil has been cut into strips and reassembled to give a layer with high conductivity through the thickness of the heat sink and in only one direction in the plane of the heat sink whereby heat to be dissipated is conducted to one edge only of the heat sink for dissipation.

24. A battery as claimed in any one of claims 17 to 23, in which the heat sink is formed for the passage of a heat transfer fluid therethrough.

25. A battery comprising two arrays of cells as claimed in claim 17, in which lower bus plates of the arrays rest on a common aluminium heat sink.

26. A battery as claimed in claim 25, in which the upper bus plate of one array of cells is connected to the lower bus plate of the other array of cells, thereby to connect the two arrays in series, by means of a number of conductive rods.

27. A battery as claimed in claim 26, in which the bus plates are of mild steel and the rods are of aluminium with mild steel end portions.

28. A battery as claimed in claim 25, including a single plate bent to serve as the upper bus plate of one array and the lower bus plate of the adjacent array, the intermediate portion of the plate extending between the arrays.

29. A battery enclosed in a thermally insulating housing which helps to maintain the battery at a required temperature, in which terminals of the battery are connected to leads which extend out of the housing, the length of each lead within the housing wall being greater than the thickness of that housing wall.

30. A battery as claimed in claim 29, in which the housing is constructed from two spaced layers of metal, with the space between the layers evacuated to give good thermal insulation properties.

31. A battery as claimed in claim 29 or claim 30, in which the portion of each lead in the wall is wound into a helical path which progresses gradually across the wall thickness.

32. A battery as claimed in claim 29, in which the dimensions of the lead vary along the path in order to give the lead the required thermal conductivity at all positions along the path.

33. A battery as claimed in any one of claims 1, 2, 5 to 7, 9, 10, 13 to 23, 25 to 30 and 32, in which the cells are sodium sulphur cells.

* * * * *

UNITED STATES PATENT AND TRADEMARK OFFICE
CERTIFICATE OF CORRECTION

PATENT NO. : 5,034,290

DATED : July 23, 1991

INVENTOR(S) : Gilbert SANDS et al.

It is certified that error appears in the above-identified patent and that said Letters Patent is hereby corrected as shown below:

Claim 4, column 8, line 23, after "at" insert --at--.

Claim 9, column 8, line 37, "any preceding claim" should read --claim 1,--.

Signed and Sealed this

Thirteenth Day of October, 1992

Attest:

DOUGLAS B. COMER

*Attesting Officer*  *Acting Commissioner of Patents and Trademarks*